UNITED STATES PATENT OFFICE.

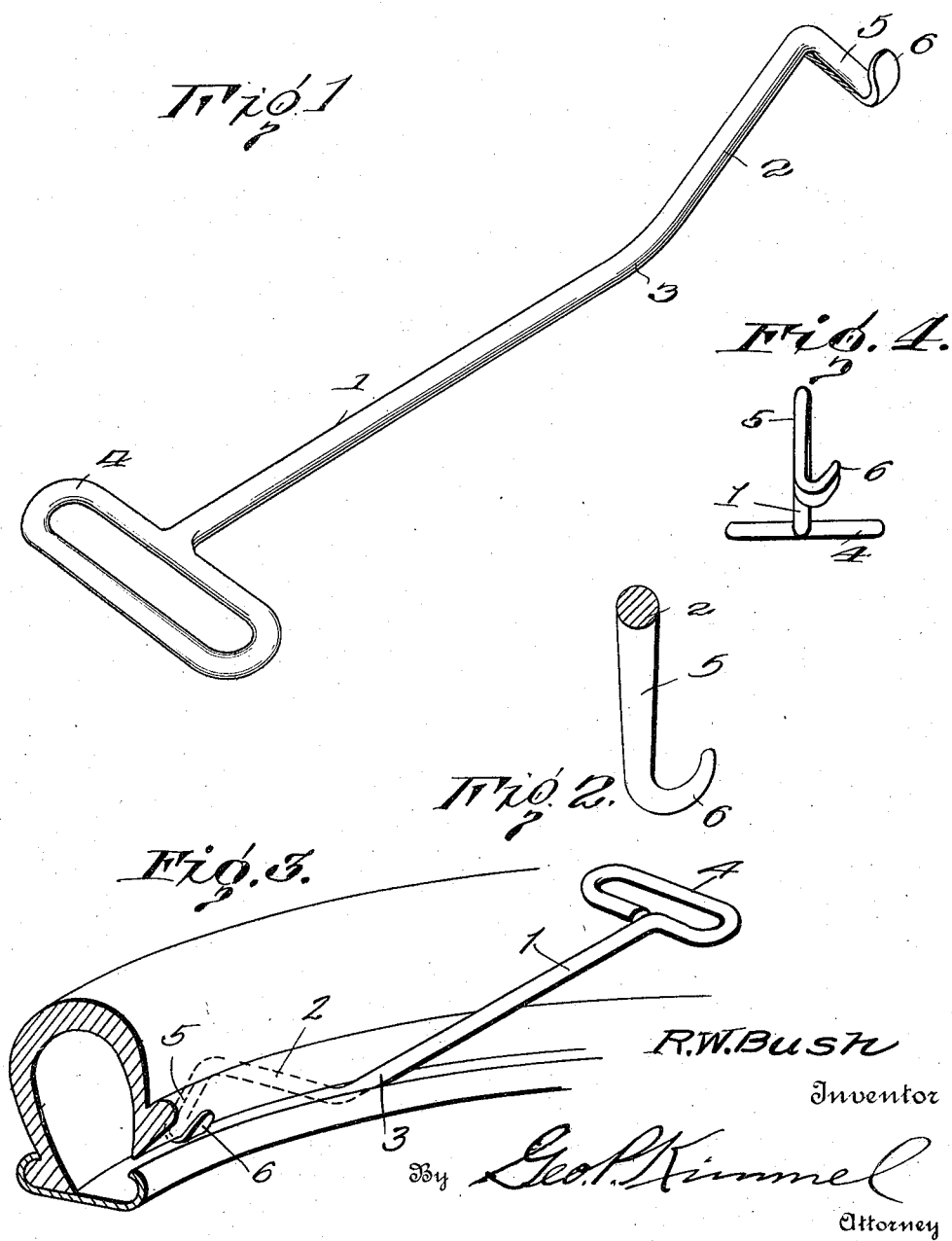

ROY W. BUSH, OF SATUS, WASHINGTON.

TIRE-TOOL.

1,300,924.   Specification of Letters Patent.   Patented Apr. 15, 1919.

Application filed July 25, 1917. Serial No. 182,680.

*To all whom it may concern:*

Be it known that I, ROY W. BUSH, a citizen of the United States, and resident of Satus, in the county of Yakima and State of Washington, have invented certain new and useful Improvements in Tire-Tools, of which the following is a specification.

This invention relates to new and useful improvements in tire tools, and the primary object of the invention is to provide a simple and efficient type of tool which is especially constructed for use in removing and replacing tire casings on demountable rims.

Another object of the invention is to provide a device of this character, which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawings:—

Figure 1 is a perspective view of the tire tool;

Fig. 2 is a vertical section looking toward the hook end of the tool;

Fig. 3 is a perspective of the improved tire tool showing the same engaged with a fragment of a tire; and Fig. 4 is a view looking at the hook end of the tool.

In describing my invention, I shall refer to the drawings in which similar reference characters designate corresponding parts throughout the several views.

The tool is formed from a single rod, preferably of metal, and comprises a bent shank portion, which includes a straight portion 1, having one end bent laterally, and extending outwardly from the portion 1, and designated by the numeral 2. The bent portion of the shank 3, forms the fulcrum point for the tool, which is operated in the manner to be hereinafter more fully described. The extremity of the straight portion 1 has a looped handle 4 formed thereon, so as to facilitate the operation of the tool.

The free end of the bent portion 2 has a laterally extending flattened arm 5 extending therefrom, in a single vertical plane with the shank, and extending downwardly and outwardly from the same. The extremity of the arm 5 is bent to form a hook 6, which extends at right angles to the said arm, and to the vertical plane in which the arm and shank is disposed.

To use the tire tool in removing a tire from the rim, first insert a tire prod under the edge of the tire prying it up until the entire tool can be inserted along side the tire prod, on the right hand side, and then while still holding the tire prod opposite the tool, pull the tire tool to the right for six or eight inches. Then pry the tire over the edge of the wheel with the tire prod next pulling the tire tool to the right six or eight inches farther. Insert the tire prod on the edge of the tire just behind the tire tool and pry over the rim, continuing this operation until the tire has been entirely removed from the rim. For use in replacing or applying the tire to a rim, apply one side of the tire casing to the rim in the usual manner, insert a tire prod under the rim and pry tire over the rim, inserting the tire tool along side of the tire prod, on left hand side with hook under rim of wheel, then while holding tire positioned with the tire prod pull to left 8 or 10 inches with tire tool. The tire may be then crimped over rim of wheel with a heel of a shoe. Repeat this operation until the tire is entirely applied.

This type of tire tool is very economically manufactured, as the same is formed of a single metal rod, that is adapted to be bent in the desired shape. This tool will be found especially valuable to motorists, and in garages, etc. The tool is very small, and is adapted to be readily placed in the conventional tool kits that are ordinarily carried.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

A tire tool including a shank having one portion of the same bent, the free end of the bent portion having a substantially right angularly disposed finger lying in the same plane therewith, the outer end of which is turned up laterally to said plane to form a hook.

In testimony whereof, I affix my signature hereto.

ROY W. BUSH.